United States Patent [19]

Miyoshi et al.

[11] Patent Number: 5,574,129
[45] Date of Patent: Nov. 12, 1996

[54] PROCESS FOR PRODUCING LACTIC ACID POLYMERS AND A PROCESS FOR THE DIRECT PRODUCTION OF SHAPED ARTICLES FROM LACTIC ACID POLYMERS

[75] Inventors: Rika Miyoshi; Tadamoto Sakai; Noriaki Hashimoto; Yukihiro Sumihiro; Kayoko Yokota; Kunihiko Koyanagi, all of Hiroshima, Japan

[73] Assignee: The Japan Steel Works, Ltd., Tokyo, Japan

[21] Appl. No.: 436,010

[22] Filed: May 5, 1995

[30] Foreign Application Priority Data

May 10, 1994 [JP] Japan .................................... 6-096021
Nov. 25, 1994 [JP] Japan .................................... 6-290879

[51] Int. Cl.⁶ .................................................. C08G 63/08
[52] U.S. Cl. .......................... 528/354; 524/755; 524/784; 525/408; 525/411; 525/415; 528/271; 528/274; 528/275; 528/283; 528/357; 528/361; 528/480

[58] Field of Search ...................... 524/755, 784; 525/408, 411, 415; 528/271, 274, 275, 283, 354, 357, 361, 480

[56] References Cited

U.S. PATENT DOCUMENTS 5,357,034 10/1994 Fridman et al. ........................ 528/354
5,444,143 8/1995 Ohta et al. .............................. 528/361

*Primary Examiner*—Shelley A. Dodson
*Attorney, Agent, or Firm*—Sughrue, Mion, Zinn, Macpeak & Seas

[57] ABSTRACT

A process for producing polylactic acid includes the steps of polycondensing lactic acid to a lactic acid prepolymer having a weight-average molecular weight of 10,000–50,000 in a batch-type polymerization reactor, and polycondensing the lactic acid prepolymer to lactic acid polymer having a weight-average molecular weight of at least 100,000 by means of a screw-type extruder.

16 Claims, 2 Drawing Sheets

PROCESS FOR PRODUCING LACTIC ACID POLYMERS AND A PROCESS FOR THE DIRECT PRODUCTION OF SHAPED ARTICLES FROM LACTIC ACID POLYMERS

BACKGROUND OF THE INVENTION

1. Field of the invention

This invention relates to a process for producing lactic acid polymers useful as biodegradable plastics. More particularly, the invention relates to a process for rapid and continuous production of a high molecular weight lactic acid polymer and a shaped article thereof, which process comprises the steps of preparing a lactic acid prepolymer by the polycondensation of inexpensive lactic acid, feeding the prepolymer into a screw-type extruder and allowing only the by-product water to be distilled off to emerge from the reaction system, with lactide and other low molecular weight compounds being refluxed as they arise in the course of reaction.

Biodegradable plastics, which will degrade environmentally after having served their purposes to be eventually recycled to nature in the form of low molecular weight compounds, are one of the subjects of intensive studies being currently made. While many plastics are known to be biodegradable, aliphatic polyesters degrade completely to monomers under environmental stresses such as microorganisms and water so that they are eventually incorporated into natural material circulation in the form of carbon dioxide and water. To take advantage of this unique feature, researchers have recently started to review the possibility of expanding the use of aliphatic polyesters from the medical area to general-purpose industrial materials which are intended to be discarded into the environment after use.

Lactic acid polymers are most typical of the biodegradable plastics based on aliphatic polyesters since they are not only high in degradability and transparency but also so highly compatible with other polymers that they can be easily modified in characteristics. Additionally, they will readily degrade to monomers upon heating or addition of specific solvents. Hence, there exists a great demand for developing new uses of lactic acid polymers as materials that can be recycled in the monomeric form.

2. Related art

Lactic acid polymers are currently produced by two methods: in one method, lactide which is a cyclic dimer of lactic acid is used as a starting material and subjected to ring-opening polymerization; the other method comprises subjecting lactic acid to dehydrative polycondensation. From an engineering viewpoint, the first approach which starts with lactide is more advantageous since ionic polymerization causes a chain reaction to occur and because the product polymer has a very high molecular weight on the order of $10^5$. This process has already been established in the laboratory. See, for example, WO 90/01521, which teaches a process for producing polymers by the ring-opening polymerization of lactide, in which polymers having various characteristics are synthesized by either blending an optically active D- or L-lactide as a plasticizer with polymer or changing the mixing or copolymerization ratio of the D- or L-lactide to optically inactive meso D,L-lactide.

However, in order to expand the use of those polymers to the medical and packaging areas, they must have weight-average molecular weights of at least about $10^5$. When the polymers are to be shaped into films and other products, molecular weights of that order are necessary so that the shaped article will exhibit mechanical strength beyond a certain level while maintaining the initial (as-produced) quality throughout the use period without readily undergoing hydrolysis. In addition, the lactide must not contain impurities such as water and solvents that will retard the polymerization reaction. To meet this requirement, the lactide is purified by several runs of recrystallization with a solvent such as ethyl acetate and it has been proposed that lactide loss due to the sequence of purifying steps be minimized by a process in which the unpurified lactide is dissolved in a water-immiscible organic solvent and wherein the solution is subjected to extraction with a basic substance in aqueous solution, with the extracted portion being separated and processed to have an increased molecular weight.

JPA 88/165430 teaches a method comprising the steps of dissolving unpurified lactide in dichloromethane or ethyl acetate, subjecting the solution to extraction with an inert salt (e.g., sodium chloride or sodium sulfate) in aqueous phase, separating lactide from within the organic solvent, and homopolymerizing or copolymerizing the separated lactide.

Despite these complicated procedures, the purified lactide is so much hygroscopic and deliquescent that there are many precautions to be observed during handling, such as the need for storage in a diphosphorus pentasulfide atmosphere to insure complete removal of water. What is more, many disadvantages have been known from an engineering viewpoint, as typified by the need to replace the atmosphere in the polymerization reactor for ring-opening polymerization by a highly pure inert gas so that the effects of oxygen and water are eliminated as much as possible.

With a view to solving these problems, JPB 90/52930 has proposed a process in which lactic acid is heated and polycondensed in an inert gas atmosphere in the presence of a catalyst (at 180° C. for 4 h in the disclosed examples) until the polycondensation reaction is completed at temperature within 220°–260° C. below vacuum level 10 mmHg (at 260° C.×2 mmHg for 8 h in the disclosed examples), whereby a lactic acid polymer having a molecular weight of 4,000–20,000 is directly produced from lactic acid.

This method is capable of converting lactic acid to its polymeric form in one step without passing through lactide, so it offers the advantage of significantly reducing the cost of polymer production. On the other hand, the method has the following problems (1)–(5) and no industrially feasible process has been established.

(1) The polycondensation of lactic acid involves a reaction system in which low molecular weight compounds that form as by-products in the reaction process such as dimers having a cyclic chain structure (e.g., lactide), lactic acid ethers and water maintain complex equilibria with the product polymer; hence, depending on the reaction control, side reactions may proceed preferentially or, if an equilibrium is reached between each of the by-products and the product polymer, the reaction for polymer production may stop at the point of time when such equilibrium is attained.

(2) The polycondensation of lactic acid is a reaction to formate ester bond between monomers; however, depending on the reaction conditions (temperature and the degree of vacuum), tin-base catalysts which are commonly used to accelerate the reaction may decompose the formed ester bonds to accelerate depolymerization reaction; as a result, the reaction for forming cyclic structures such as lactide predominates and the rate of the reaction for polymer formation may decrease.

(3) The dehydrative polycondensation of lactic acid can be further accelerated by allowing leaving components such as free water and by-product water to be distilled off from the system under vacuum but to this end, the degree of vacuum in the batch-type polymerization reactor has to be enhanced significantly; in this case, however, lactic acid oligomers and monomeric lactic acid in the reaction solution are prone to experience a phenomenon that may well be described as "bumping" and they will be distilled off together with the by-product water to cause occasional significant drops in the yield of the product polymer.

(4) When a conventional batch-type polymerization reactor is used for lactic acid polymer synthesis, the viscosity of the reacting solution increases with the progress of reaction and the resulting deficiency in the force of agitation and other problems will deteriorate the polymer surface refreshing action, causing the by-product water to be confined within the polymer in such a state that it is no longer easily removable.

(5) The reaction for converting lactic acid to a high polymer form by dehydrative polycondensation involves the elimination of water under heated conditions; however, due, not only to the low thermal stability of the product polymer, but also to the strong likelihood for hydrolysis to occur in the presence of the water that has been brought into the reaction system from the starting material or the by-product water, there is strong likelihood that the molecular weight of the product polymer will drop in the process of reaction.

In a method for making a final product, the lactic acid polymer is conventionally pelletized and the pellets are processed into a film, a container or other shapes. JPA 94/299054 proposes a method in which the lactic acid polymer is first crystallized and then injected or blow molded with care being taken to insure pellets will not thermally fuse together in the hopper of the molding machine.

However, the lactic acid polymer which has only low thermal stability will deteriorate due to the thermal history created in the pelletizing process and the quality of the shaped article is often affected in an undesirable manner. Additionally, if the lactic acid polymer is stored in the form of pellets as a molding material, hydrolysis due to moisture absorption may potentially lower the molecular weight of the polymer and, what is more, the residual water in the pellets can be a cause of deterioration in the physical properties of the shaped article being molded. To avoid these possibilities, it has been necessary to dry the pellets before they are molded. The addition of such an extra step unavoidably increases the operating cost of the conventional process, which therefore is not an industrially advantageous approach.

SUMMARY OF THE INVENTION

The present invention has been accomplished in view of the foregoing problems (1)–(5) of the prior art technology and it aims at providing a process by which a lactic acid polymer of an increased molecular weight and a shaped article thereof can be produced in a more rapid and efficient manner.

The present invention provides a process that comprises basically the steps of polycondensing lactic acid to form a lactic acid prepolymer having a weight-average molecular weight of 10,000–50,000 and polycondensing said prepolymer to produce a lactic acid polymer having a weight-average molecular weight of at least 100,000. In the process, polycondensation reaction of lactic acid prepolymer is performed in the batch-type polymerization reactor, after that, the lactic acid prepolymer is fed to a screw-type extruder and the resulting lactide and low molecular weight compounds of lactic acid are refluxed into the reaction system by means of a refluxing device while the polycondensation reaction is allowed to proceed to produce a polymer of an increased molecular weight, which can directly be molded into the shape of a final product.

In the synthesis of the lactic acid prepolymer and the reaction for converting it to a higher molecular weight form, only the water being produced is distilled off to emerge from the reaction system whereas not only lactide but also the lactic acid and low molecular weight forms thereof that are distilled off together with water are refluxed into the reaction system; as a result, the equilibria between the group of low molecular weight compounds in the reacting solution such as monomeric lactic acid, lactide, water and lactic acid ether (all being in the feed system) and the group of polymeric and oligomeric lactic acids (both being in the product system) will shift selectively in a direction favored by polymer formation. Thus, the reaction under consideration involves not only the equilibrium between monomer (in the feed system) and polymer (in the product system) which occurs in a common dehydrative polycondensation reaction, but also the cyclic chain equilibrium between lactide (in the feed system) and polymer (in the product system). Based on this fact, the present inventors found that when the concentrations of the components on the feed side were controlled to be constant by refluxing, the chemical equilibrium between cyclic chain structures became favorable to the chain structure side, permitting the molecular bond forming reaction to proceed selectively from the monomer to polymer side. In the present invention, this equilibrium relationship is utilized to carry out the intended reaction in an efficient manner.

It has also been found that polymers of increased molecular weights can be produced efficiently if the sequence of process steps are performed by means of a batch-type polymerization reactor and a screw-type extruder that are combined to optimize their constructions and capacities in accordance with the specific stage of the reaction. Another finding is that if the product polymer is not pelletized but directly processed into the shape of a final product as it is extruded in the molten state from the extruder, the energy loss which would otherwise occur when pellets were remelted can be eliminated and the deterioration in quality during molding can also be minimized. The present invention has been accomplished on the basis of these findings.

Thus, the present invention provides a process in which a lactic acid prepolymer having a weight-average molecular weight of 10,000–50,000 is prepared in a batch-type polymerization reactor equipped with reflux tubes and then fed into a screw-type extruder for polycondensation under heating in vacua and, at the same time, free water and the by-product water are distilled off while only lactide and low molecular weight compounds of lactic acid are selectively refluxed as the reaction proceeds, whereby a lactic acid polymer having a weight-average molecular weight of at least 100,000 and a shaped article thereof are produced continuously.

DETAILED DESCRIPTION OF THE PREFERRED EMBODIMENTS

Figure 1:
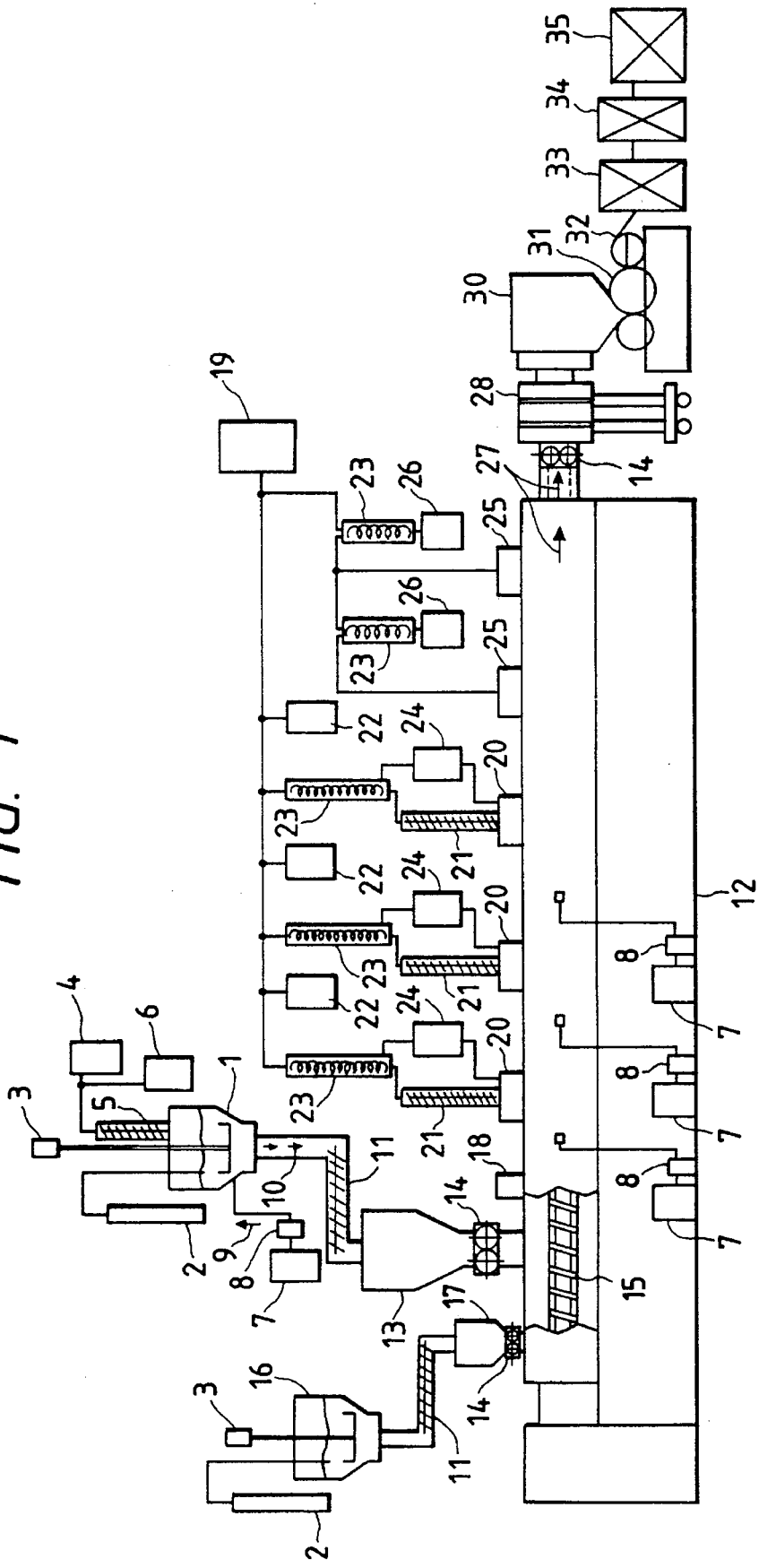
FIG. 1 is a diagrammatic view for illustrating the process of the invention.

Preffered embodiments of the present invention will now be described with refereces to the drawings.

The lactic acid to be used in the invention may be either optically active (e.g., D- or L-lactide) or inactive (i.e., D,L-lactide) or a mixture of optical active and inactive forms. Preferably, lactic acid with a purity of at least 85% should be used.

Stated specifically, the first step of the process of the invention is charging starting lactic acid into a batch-type polymerization reactor, which is purged with nitrogen or argon gas; then, a polycondensation reaction is performed under heating in vacua to prepare a lactic acid prepolymer.

It has heretofore been held that if lactic acid is subjected to polycondensation in a batch-type polymerization reactor by the conventional method described above, the weight-average molecular weight of the polymer that can be produced is no more than about 10,000 due to several reasons such as the chemical equilibria in the reacting solution and the depolymerization of the product polymer. However, in accordance with the invention, by-products are refluxed efficiently and the components lost by distilling off under vacuum are positively compensated, whereby a lactic acid prepolymer having a weight-average molecular weight of 10,000–50,000 can be produced within a short time. It should, however, be noted that for successful performance of the process of the invention, care must be taken to strictly control the atmosphere and temperature in the polymerization reactor so that the effects of various factors that will limit the rate of the polymer forming reaction can be avoided as much as possible.

The temperature for heating lactic acid during its dehydrative polycondensation is preferably 90°–180° C., with the range of 120°–175° C. being more preferred. If the heating temperature is too low, the intended reaction will not occur; if the temperature is excessive, depolymerization occurs and the lactide forming reaction is accelerated. The level of vacuum is preferably 0.1–100 mmHg, with the range of 1–10 mmHg being more preferred. Further lowering the vacuum level ($\leq 0.1$ mmHg) is difficult to achieve considering the construction of the polymerization reactor and the capability of the vacuum pump used. In addition, not only water but also monomeric lactic acid will be distilled off. Increasing the vacuum level (>100 mmHg) is also undesirable since the by-product water will not be distilled off.

In the dehydrative polymerization of lactic acid, allowing the by-product water to be rapidly distilled off from the reaction system is important for the purpose of increasing the reaction rate. On the other hand, considering the fact that the reaction system of interest is based on competition with the lactide forming reaction, it is necessary to minimize the formation of lactide. However, such side reaction cannot be totally inhibited by merely controlling the reaction conditions. Therefore, reflux tubes are installed on the polymerization reactor and the evaporated lactide and low molecular weight forms of lactic acid are recovered and refluxed into the reaction system so that the chemical equilibria will shift in a direction toward polymer formation. If the temperature in the reflux tubes is set below the boiling points of lactide and the reacting solution (lactic acid) under vacuum, it is assured that only water is selectively distilled off.

Even if refluxing is done in this manner, part of the lactide is not recovered but distilled off to emerge from the reaction system. In order to make up for this lactide loss and shift the chemical equilibria in the reaction soluting in a direction favored by the polymer, melting lactide is supplied direct into the reacting solution in the polymerization reactor. The supply of the lactide should be adjusted as appropriate for the lactide loss determined by trapping outside the reaction system at given time intervals.

If the temperature in the reflux tubes drops below the melting point of the lactide, crystallization will immediately occur and the tubes are clogged by the lactide under reflux. To prevent this problem, suitable solvents may be used for lactide refluxing. Considering co-refluxing with lactide, preferred solvents are those boiling at temperatures close to the boiling point of lactide in vacua (146° C. at 10 mmHg), such as: dimethylbenzyl ether (144° C. at 10 mmHg); benzylphenyl ether (144° C. at 10 mmHg); 1,2-dibromodecane (137° C. at 10 mmHg); diphenylethane (13° C. at 10 mmHg); 1,1-diphenylethylene (135° C. at 10 mmHg); diphenylmethane (123° C. at 10 mmHg); diphenyl ether (114° C. at 10 mmHg); 4-isopropylphenol (108° C. at 10 mmHg); and 1-octanol (88.3° C. at 10 mmHg).

Solvents having unduly low boiling points in vacua will not liquefy in the reflux tubes to be distilled off and emerge from the reaction system without being refluxed with lactide. To make up for this solvent loss, an additional amount of the same solvent must be supplied to the reaction system but this adds the complexity to the process and makes it economically infeasible. On the other hand, solvents having too high boiling points in vacua will not form an azeotropic mixture with water in the above-specified temperature ranges for dehydrative polycondensation of lactic acid and the by-product water can be distilled off only with great difficulty. The addition of solvents ranges generally from 5 to 27 parts by weight, preferably from 6 to 25 parts by weight, per part by weight of the lactic acid feed.

The reflux tubes for use in the invention are made of stainless steel with a jacket fitted around the sidewall of each reflux tube. The reflux tubes are installed vertically on the top cover of the polyerization reactor. A spiral resistor in a counter-corkscrew direction is provided within each reflux tube and the temperature in the tube is controlled by circulating a heating medium through the jacket. If solvents are used in lactide refluxing, the appropriate temperature range is from 50° to 130° C., preferably 60°–120° C. If no solvents are used, the range is adjusted to 90°–180° C., preferably to 95°–170° C. An electric heater may be used for the purpose of temperature control. During temperature control, the degree of vacuum in the reflux tubes should be controlled to keep between 0.1 and 100 mmHg, which is the range already specified for the dehydrative polycondensation of lactic acid.

If anti-clogging solvents are used, lactide will reflux into the reaction soluting together with the solvents. In order to insure complete refluxing of solvents having relatively low boiling points in vacua, the top of each reflux tube is preferably equipped with a cooling tube so that water, Dry Ice or liquid nitrogen can selectively be used depending upon the boiling point of the solvent to cool and recover the refluxing solvent.

Catalysts may be used in the reaction. Exemplary catalysts include stannous chloride, tin octylate and antimony oxide. These catalysts are desirably added to the reacting solution in the form of a complete solution in solvents such as tetrahydrofuran, butyl lactate, chloroform, acetone, xylene, ethanol and benzene. Care must be taken to avoid adding the catalysts to the reacting solution while it is very hot; otherwise, they will act as depolymerization catalysts for the lactic acid oligomer (lactic acid prepolymer) in the reacting solution and can promote lactide formation.

Considering the highly toxic nature of the catalysts listed above, other catalyst species may be used, as exemplified by manganese acetate, acetoacetyl aluminum, aluminum acetate and zinc diethyl.

The catalysts listed above may be used in appropriate combinations; for instance, manganese acetate is used to accelerate the polycondensation of lactic acid whereas antimony oxide is used as a catalyst for suppressing the side reactions occurring in the process of polycondensation so that the equilibrium between the polymeric and monomeric forms of lactic acid which are present in the reacting solution is shifted toward the side favored by the polymer.

The catalysts may be used in amounts of 0.001–1 parts by weight, preferably 0.1–0.5 parts by weight, per part by weight of the starting monomeric lactic acid.

As a result of the dehydrative polycondensation of lactic acid, a lactic acid prepolymer having a weight-average molecular weight of 10,000–50,000 is prepared in the batch-type polymerization reactor. If polycondensation is performed in the absence of solvents, prepolymers having weight-average molecular weights in excess of 50,000 are so much increased in melt viscosity that they cannot be handled effectively with a batch polymerizer of ordinary agitating performance and the resulting deficiency in the action for refreshing the polymer surface causes a drop in the reaction rate, making it difficult for the prepolymer to be obtained quantitatively. This, prepolymers having excessively high weight-average molecular weights are unsuitable for use in the process of the invention.

Prepolymers having weight-average molecular weights less than 10,000 also are not used in the present invention because in the subsequent processing by an extruder, it takes so much time to yield the desired higher molecular weight form of lactic acid that the reaction will not be complete within the residence time; hence, the process using those prepolymers having weight-average molecular weights less than 10,000 is not practical. What is more, such polymers have low melt viscosities on the order of 100 poises and, under the subatmospheric pressure that is created within the cylinder during polycondensation, they are prone to distill off through vent ports together with the by-product water and lactide, eventually reducing the yield of the prepolymer.

Thus the prepared lactic acid prepolymer is fed into a twin screw extruder and subjected to further polycondensation with water being removed under heating in vacua until a lactic acid polymer of a desired high molecular weight.

The screw-type extruder to be used in the invention may be a single or twin screw extruder that is commonly employed in plastics molding and which comprises a screw or screws, a cylinder, heating units, a drive unit and vent ports for degasification or devolatilization. A twin screw extruder is preferred; the two screws may corotate or counterrotate and the flights on one screw may or may not mesh with those on the other screw. A twin screw extruder preferably used in the invention is of an intermeshed type and has a plurality of heating units mounted on the circumference of the cylinder in such a way that they are capable of temperature control independently of one another, a plurality of vent ports through which gases or volatile components can be removed from the cylinder in the areas where the heating units are provided, and an L/D ratio of 30–70 (L; the length of the screw, D; the diameter of the screw). Using such a twin screw extruder having a large number of heating units and vent ports is preferred since temperature control can be effected for the progressive stages of reaction in the different zones of the cylinder in the extruder while, at the same time, the by-products formed at the various stages of reaction can be distilled off under the conditions (temperature and the degree of vacuum) appropriate for the respective substances.

The cylinder is preferably heated at 100°–200° C., more preferably at 115°–180° C. If the cylinder temperature is less than 100° C., the reaction rate is undesirably slow. If the cylinder temperature exceeds 200° C., not only the intended polycondensation reaction but also the unwanted depolymerization reaction will occur. A reaction time of about 30–50 min will usually suffice if the cylinder temperature is within the range set forth above.

In order to insure efficient removal of water that forms as a by-product in the process of reaction, solvent may be used as in the case of the preparation of the lactic acid prepolymer. The addition of solvents ranges generally from 2 to 20 parts by weight, preferably from 5 to 13 parts by weight, per part by weight of the lactic acid prepolymer supplied.

The level of the vacuum to be created in the extruder ranges preferably from 0.1 to 100 mmHg, more preferably from 1 to 50 mmHg. If the vacuum level is too high (the pressure is not adequately reduced), water that remains unremoved from the reacting solution will retard the smooth progress of the reaction.

Due to the evacuation, air may leak through the grand portion of the extruder to be blown into the vent ports, whereupon the lactic acid prepolymer filling up the cylinder may occasionally be sucked into the vent ports. If this phenomenon occurs, the desired degree of vacuum will not be created in the cylinder and, what is more, the interior of the vent pipes and the vacuum pump will be clogged by the lactic acid prepolymer that has "vented up" and disassembling, cleaning and other cumbersome actions need be taken as remedies.

Hence, in order to prevent air from leaking through the grand portion of the extruder, a polymer identical to the lactic acid prepolymer feed except that it has an increased degree of polymerization is supplied through a separate hopper and mixed with the prepolymer feed so that the melt viscosity of the latter is sufficiently increased to form a resin-seal at the entrance to the reactive region while a vacuum is maintained within the cylinder. A suitable polymer for use in forming the resin-seal has preferably a weight-average molecular weight ranging from 80,000 to 250,000, more preferably from 100,000 to 200,000. Polymers with weight-average molecular weights below 80,000 are not suitable for use since their melt viscosity at the reaction temperature is too low to enable the formation of an effective resin-seal. On the other hand, polymers having weight-average molecular Weights in excess of 250,000 have a good sealing property since they provide a sufficiently high melt viscosity in the seal zone; on the other hand, there is strong likelihood for the occurrence of a backflow of the lactic acid prepolymer feed. Hence, such polymers having excessive molecular weights are not suitable for the purpose of making an effective resin-seal.

The resin-seal forming polymers are desirably used with their feed and molecular weight being properly controlled in such a way that the lactic acid prepolymer feed, as mixed with these polymers, has melt viscosities of 1,000–20,000 poises, preferably 2,000–10,000 poises, at the feeding zone.

Other polymers that can be used to form the resin-seal include a refluxed portion of the polymer that has been produced by the process of the invention, as well as defective parts that are rejected from the polymer molding process. Alternatively, one may use a polymer that is obtained by first purifying the by-product lactide by convenient means and then subjecting it to ring-opening polymerization in the presence of a catalyst.

Catalysts may be used to perform the reaction in the extruder. Exemplary catalysts are the same as those listed above in connection with the preparation of the lactic acid prepolymer and include stannous chloride, tin octylate, antimony oxide, etc. The addition of such catalysts ranges generally from 0.1 to 1 parts by weight, preferably from 0.2 to 0.5 parts by weight.

In order for polycondensating reaction to proceed within the screw-type extruder, degasification is effected through the vent ports with reflux tubes so that the by-product water is distilled off to emerge from the reaction system whereas lactide which is another by-product and low molecular weight forms of lactic acid which have been vaporized together with the by-product water are selectively refluxed into the system.

The reflux tubes are stainless steel cylinders with a sheathed wall and installed vertically on top of vent boxes. As in the case of the preparation of the lactic acid prepolymer, a heating medium is circulated around the tubes to control the temperature in the reflux tubes at 50°–130° C., preferably at 60°–120° C., when solvents are used, and at 90°–180° C., preferably at 95°–170° C., when no solvents are used.

In the refluxing operation described above, a portion of the lactide fails to be recovered and it instead is lost from the system. It is necessary to make up for the loss and shift the chemical equilibria in the reacting solution toward the polymer forming side as in the case of the preparation of the lactic acid prepolymer. To this end, lactide in the molten state is metered by a plunger pump and supplied into the system through an inlet port on the sidewall of the cylinder while the reaction is being carried out.

The solvent used in preparing the lactic acid prepolymer, as well as the solvent supplied into the extruder for removing the by-product water by azeotropic distillation are removed by devolatilization through the vent ports on the cylinder in zones close to its distal end. Any residual solvents in the product polymer will lead to a marked deterioration in the quality of the final product; hence, devolatilization should be performed to such an extent that the solvent content of the resulting lactic acid polymer is no more than 500 ppm, preferably no more than 300 ppm.

The solvents removed by devolatilization are recovered by traps fitted with cooling tubes. The recovered solution contains a plurality of solvents present in admixture and may be separated and purified by fractional distillation for another use.

The rotational speed of the screw or screws in the extruder is also important for the purpose of accelerating the polycondensation of the lactic acid prepolymer and efficiently removing the by-product water from the polymer that has its viscosity increased with the progress of the reaction. Given this consideration, the rotational speed of the screw or screws is preferably set to lie within the range from 100 to 300 rpm, with the range from 150 to 250 rpm being particularly preferred.

The polycondensation of the lactic acid prepolymer under the conditions described above will yield lactic acid polymer having a weight-average molecular weight of at least 100,000. The thus produced polymer was characterized or evaluated for its characteristics by the following methods:

| | |
|---|---|
| Molecular Weight Measurement: | Gel Permeation Chromatography (GPC) |
| Equipment type | HLC-8020 (product of Tosoh Corp.) |
| Apparatus Columns | TSK gel GXH-$H_{HR}$ X2 |
| | TSK gel G5000H-$H_{HR}$ X1 |
| | TSK gel G2500H-$H_{HR}$ X1 |
| Column temperature | 35° C. |
| Eluant | Chloroform |
| Flow rate | 1.0 ml/min |
| Detector | Differential refractometer |
| Sample concentration | 0.2% (wt/v) |

*Measured molecular weights were expressed in terms of relative values as referenced to polystyrene standards.

An example of the process for producing lactic acid polymer in accordance with the invention is described with reference to FIG. 1 in the attached drawings.

Lactic acid is fed into a batch-type polymerization reactor 1 and subjected to dehydrative polycondensation, with the temperature of the reacting solution being set at a predetermined value and with nitrogen gas being supplied from its container 2. During the reaction, a vacuum is created within the polymerization reactor 1 by means of a vacuum pump and the resulting lactide, lactic acid or low molecular compounds thereof are recovered in a reflux tube 5 and refluxed into the polymerization reactor. Thus, a lactic acid prepolymer is prepared. The by-product water that has not been recovered in the reflux tube is cooled and recovered in a trap 6.

In the next step, lactide 9 that has been heated to melt in a separate tank 7 is supplied in a metered amount into the lactic acid prepolymer solution 10 in the polymerization reactor 1 by means of a plunger pump 8; this is to replenish the lactide on the feed side of the reacting solution so that the chemical equilibria in the solution will be shifted in a direction favored by the polymer production side.

Then, the melt of lactic acid prepolymer 10 is passed through a feed pipe 11 to be supplied into a hopper 13 on a twin screw extruder 12. A gear pump 14 allows the prepolymer 10 to be further supplied in a predetermined amount into the extruder 12. If desired, lactic acid polymer which has a higher molecular weight than the lactic acid prepolymer 10 may be heated to melt in a tank 16 and thence supplied into a hopper 17 located upwardly the hopper 13 and fed into the extruder 12 by gear pump 14 so that a resin-seal for preventing the leakage of air from the grand portion of the extruder 12 is formed to maintain vacuum in the reactive region of the cylinder.

If necessary, a catalyst may be added through an inlet port 18 on the cylinder.

As the prepolymer flows through the cylinder while it is kneaded by means of the screws 15, a plurality of heating units heat the prepolymer at different temperatures in different zones so that it undergoes polycondensation. In the process of this reaction, heat is provided to prepolymer not only by the heating units but also by the shear generated under the kneading action of the screws. Hence, more heat is supplied than has been actually applied, whereby the reaction will proceed more smoothly.

On the other hand, the polycondensation of the prepolymer is an exothermic reaction and the excessive heat supply will cause thermal decomposition of the polymer. Hence, the cylinder temperature must be strictly controlled within the range specified hereinabove to ensure against such destructive reaction.

During the polycondensation of the lactic acid prepolymer, the interior of the cylinder is held in vacua by means of a vacuum pump 19 and, hence, lactide, water, low molecular weight compounds of lactic acid, etc. are discharged through vent ports 20 to emerge as gases from the cylinder of the extruder. Vent boxes at the vent ports 20 are fitted with reflux tubes 21, in which lactide and the low molecular weight compounds of lactic acid are liquified and return to the reacting solution whereas water is not recovered in the reflux tubes but simply sent to traps 22.

Any solvents that have not been recovered in the reflux tubes are liquified in cooling tubes 23 and recovered in traps 24 so that they may be returned into the reaction system.

The solvent used in the preparation of the lactic acid prepolymer, as well as the solvent added to the extruder for removing the by-product water by azeotropic distillation are successively removed through vent ports 25. The thus removed solvents are cooled and recovered in traps 26 fitted with cooling tubes 23. IF necessary, the recovered solvents may be separated and purified by fractional distillation for further use.

Thus, the lactic acid prepolymer fed into the extruder is subjected to continuous polycondensation reaction which is controlled to be completed within the residence time specified for the apparatus. lactic acid polymer 27 which forms in the molten state as a result of the reaction is pushed forward by the screws past a screen 28, thence extruded through a die 30. For shaping into a film, the polymer is fed into a T-die 30, from which it emerges for processing by casting rolls 31 into a film of lactic acid polymer 32 as the final product.

The following examples are provided for the purpose of further illustrating the present invention but are in no way to be taken as limiting.

EXAMPLE 1

A 10 l batch-type polymerization reactor equipped with a stirrer, a thermocouple, a $N_2$ gas supply tube and a reflux tube was charged with L-lactic acid, as well as a catalyst ($SnCl_2$) that was added in an amount of 0.5 parts by weight per part by weight of L-lactic acid. Reaction was then performed at an evacuated pressure of 5–7 mmHg and at a controlled temperature of 120°–165° C., yielding L-lactic acid prepolymer having a weight-average molecular weight of 44,000.

A part of the lactide was not recovered in the reflux tube but distilled off to emerge from the reaction system; to make up for the resulting loss, a corresponding amount of lactide was directly fed into the lactic acid prepolymer to sustain the reaction.

Figure 2:
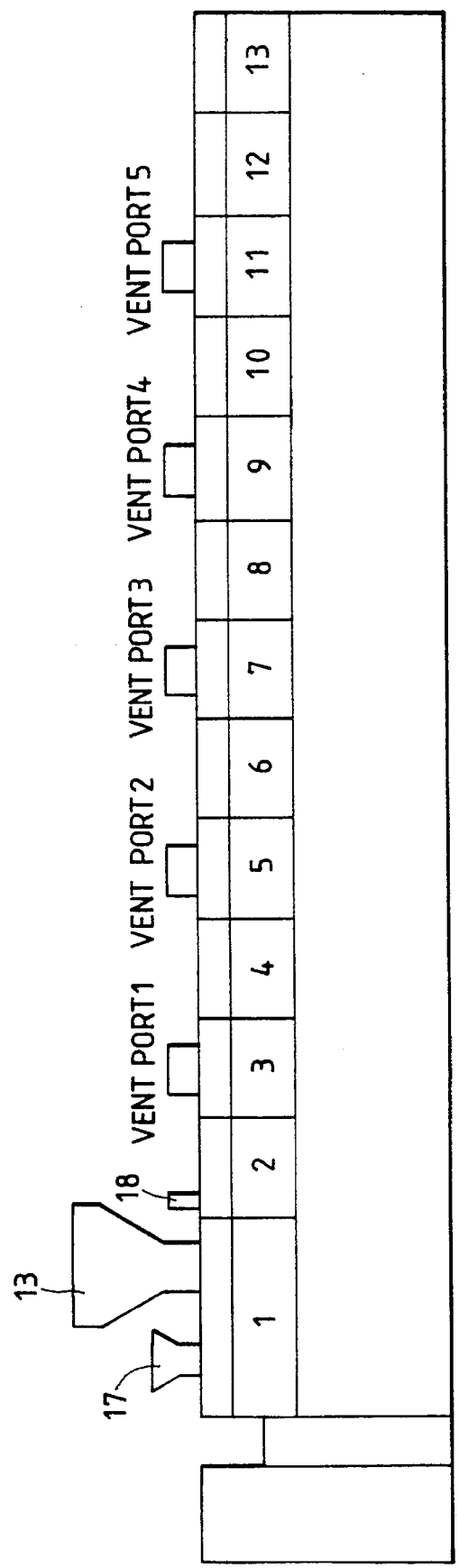
FIG. 2 is a diagram showing the concept of an exemplary screw-type extruder that can be used for implementing the process of the invention.

The prepolymer was then fed into an extruder and subjected to polycondensation in a nitrogen gas atmosphere. The extruder was of a twin screw, intermeshed type (L/D= 49, screw dia; 44 mm), with the screws being capable of both co- and counter-rotation. As FIG. 2 shows, the cylinder consisted of a total of thirteen zones that could be set at different temperatures. Five zones (Nos. 3, 5, 7, 9 and 11) had vent ports through which both degasification and devolatilization could be done. "Consisting of zones" means that different positions in the cylinder can be set at different temperatures, not that the cylinder is physically divided into separate zones.

The extruder was operated under the following conditions:

| | |
|---|---|
| Feed rate: | 3.50 kg/h |
| Screw rotating at: | 180 rpm |
| Cylinder temperature: | zone 1 = 90° C. |
| | zones 2 & 3 = 150° C. |
| | zones 4–10 = 170° C. |
| | zones 11–13 = 165° C. |
| | die = 165° C. |

The cylinder was supplied with L-lactic acid polymer (Weight-average molecular weight ($\overline{Mw}$)=154,300) as a resin-seal forming material through the hopper fitted on zone 1.

Additionally, the cylinder was charged with catalyst $SnCl_2$ in an amount of 0.2 parts by wight per part by weight of the prepolymer feed through the inlet port fitted on zone 2. The reaction was performed with the cylinder evacuated to 5–20 mmHg while water and other low molecular weight forms were removed through the vent ports.

The temperature in the reflux tubes fitted on the vent boxes at vent ports 1, 2 and 3 was set at 120°–160° C., so that part of the lactide and lactic acid prepolymer was liquefied and recovered and then refluxed from the vent ports into the cylinder. Water that was isolated from the lactide and the like within the reflux tubes was recovered as such into traps. The lactide that was not recovered in the reflux tubes but simply lost by evaporation was compensated by supplying a metered amount of molten lactide through an inlet on the sidewall of the cylinder so as to sustain the polycondensation reaction.

Any solvents that remained in the product polymer were devolatilized through vent ports 4 and 5 at the final stage of the polymer production process.

The time of reaction within the extruder (as calculated from the average retention time in the extruder) was about 45 min.

The polymer emerging from the extruder after the end of the reaction was found to have a weight-average molecular weight of 111,500, which was higher than 100,000, or a minimum value that enabled molding into films, containers and other shapes that would require mechanical strength.

The polymers thus produced were passed through a T-die to be shaped into packaging films, which were found to have the following mechanical characteristics: tensile strength; 225 kgf/cm$^2$, elongation; 35%.

EXAMPLE 2

A 10 l batch-type polymerization reactor of the same type as used in Example 1 was charged with L-lactic acid, as well as a catalyst (tin octylate) that was added in an amount of 0.5 parts by weight per part by weight of L-lactic acid. Reaction was then performed at an evacuated pressure of 2–8 mmHg and at a controlled temperature of 120°–175° C., yielding L-lactic acid prepolymer having a weight-average molecular weight of 43,000.

A part of the lactide was not recovered in the reflux tube but distilled off to emerge from the reaction system; to make up for the resulting loss, a corresponding amount of lactide was directly fed into the lactic acid prepolymer to sustain the reaction.

The prepolymer was then fed into an extruder and subjected to polycondensation in a nitrogen gas atmosphere. The extruder was of the same type as used in Example 1 and operated under the following conditions:

| | |
|---|---|
| Feed rate: | 3.75 kg/h |
| Screw rotating at: | 150 rpm |
| Cylinder temperature: | zone 1 = 90° C. |
| | zones 2 & 3 = 150° C. |
| | zones 4–10 = 175° C. |
| | zones 11–13 = 160° C. |
| | die = 160° C. |

The cylinder was supplied with L-lactic acid polymer ($\overline{Mw}$=162,800) as a resin-seal forming material through the hopper fitted on zone 1.

Additionally, the cylinder was charged with catalyst tin octylate in an amount of 0.3 parts by weight per part by weight of the prepolymer feed through the inlet port fitted on zone 2. At the same time, 1-octanol was added through the catalyst inlet by means of a rotary pump in an amount of 8.3 parts by weight per part by weight of the prepolymer feed. The reaction was performed with the cylinder evacuated to 5–10 mmHg while water and other low molecular weight forms were removed through the vent ports.

The temperature in the reflux tubes fitted on the vent boxes at vent ports 1, 2 and 3 was set at 60°–90° C., so that part of the lactide, octanol and lactic acid prepolymer was liquefied and recovered and then refluxed from the vent ports into the cylinder. Water that was isolated from the lactide and the like within the reflux tubes was recovered as such into traps without returning to the reaction system. The lactide that was not recovered in the reflux tubes but simply lost by evaporation was compensated by supplying a metered amount of molten lactide through an inlet on the sidewall of the cylinder so as to sustain the polycondensation reaction.

Any solvents that remained in the product polymer were devolatilized through vent ports 4 and 5 at the final stage of the polymer production process.

The time of reaction within the extruder was about 42 min.

The polymer emerging from the extruder after the end of the reaction was found to have a weight-average molecular weight of 132,500, which was higher than 100,000, or a minimum value that enabled molding into films, containers and other shapes that would require mechanical strength.

The polymers thus produced were passed through a T-die to be shaped into packaging films, which were found to have the following mechanical characteristics: tensile strength; 242 kgf/cm$^2$, elongation; 37%. EXAMPLE 3

A 10 l batch-type polymerization reactor of the same type as used in Example 1 was charged with L-lactic acid, as well as a catalyst (SnCl$_2$) that was added in an amount of 0.3 parts by weight per part by weight of L-lactic acid. Reaction was then performed at a evacuated pressure of 2–10 mmHg and at a controlled temperature of 120°–173° C., yielding L-lactic acid prepolymer having a weight-average molecular weight of 39,940.

A D,L-lactic acid prepolymer having a weight-average molecular weight of 43,650 was prepared under substantially the same conditions as above. The two types of prepolymer were fed into an extruder at an L- to D,L- lactic acid prepolymer mixing ratio of 7:3 and subjected to polycondensation in a nitrogen gas atmosphere. The extruder was of the same type as used in Example 1 and operated under the following conditions:

| | |
|---|---|
| Feed rate: | 3.45 kg/h |
| Screw rotating at: | 180 rpm |
| Cylinder temperature: | zone 1 = 90° C. |
| | zones 2 & 3 = 150° C. |
| | zones 4–10 = 175° C. |
| | zones 11–13 = 170° C. |
| | die = 170° C. |

The cylinder was supplied with L-lactic acid polymer ($\overline{Mw}$=170,240) as a resin-seal forming material through the hopper fitted on zone 1.

Additionally, the cylinder was charged with catalyst tin octylate in an amount of 0.5 parts by weight per part by weight of the prepolymer feed through the inlet port fitted on zone 2. At the same time, dimethylbenzyl ether was added through the catalyst inlet in an amount of 5.5 parts by weight per part by weight of the prepolymer feed. The reaction was performed with the cylinder evacuated to 5–10 mmHg while water and other low molecular weight forms were removed through the vent ports.

The temperature in the reflux tubes fitted on the vent boxes at vent ports 1, 2 and 3 was set at 90°–120° C., so that part of the lactide, dimethylbenzyl ether and lactic acid prepolymer was liquefied and recovered and then refluxed from the vent ports into the cylinder. Water that was isolated from the lactide and the like within the reflux tubes was recovered as such into traps without returning to the reaction system. The lactide that was not recovered in the reflux tubes but simply lost by evaporation was compensated by supplying a metered amount of molten lactide through an inlet on the sidewall of the cylinder so as to sustain the polycondensation reaction.

Any solvents that remained in the product polymer were devolatilized through vent ports 4 and 5 at the final stage of the polymer production process.

The time of reaction within the extruder was about 46 min.

The polymer emerging from the extruder after the end of the reaction was found to have a weight-average molecular weight of 101,500, which was higher than 100,000, or a minimum value that enabled molding into films, containers and other shapes that would require mechanical strength.

As it was kept heated, the synthesized polymer was applied onto a sheet of base paper to form a coat in a thickness of about 60 μm. The coat exhibited a reasonable degree of flexibility and mechanical strength without separating from the adherend (base paper) or developing cracks.

EXAMPLE 4

A 10 l batch-type polymerization reactor of the same type as used in Example 1 was charged with L-lactic acid, as well as a catalyst (manganese acetate) that was added in an amount of 0.5 parts by weight per part by weight of L-lactic acid. Reaction was then performed at an evacuated pressure of 3–9 mmHg and at a controlled temperature of 120°–170° C., yielding L-lactic acid prepolymer having a weight-average molecular weight of 38,690.

A D,L-lactic acid prepolymer having a weight-average molecular weight of 48,630 was prepared under substantially the same conditions as above. The two types of prepolymer were fed into an extruder at an L- to D,L- lactic acid prepolyer mixing ratio of 8:2 and subjected to polycondensation in a nitrogen gas atmosphere. The extruder was of the same type as used in Example 1 and operated under the following conditions:

| | |
|---|---|
| Feed rate: | 3.25 kg/h |
| Screw rotating at: | 150 rpm |
| Cylinder temperature: | zone 1 = 90° C. |
| | zones 2 & 3 = 155° C. |
| | zones 4–10 = 165° C. |
| | zones 11–13 = 160° C. |
| | die = 160° C. |

The cylinder was supplied with L-lactic acid polymer ($\overline{Mw}$=160,350) as a resin-seal forming material through the hopper fitted on zone 1.

Additionally, the cylinder was charged with catalyst tin octylate in an amount of 0.5 parts by weight per part by weight of the prepolymer feed through the inlet port fitted on zone 2. At the same time, diphenylmethane was added through the catalyst inlet in an amount of 5.9 parts by weight per part by weight of the prepolymer feed. The reaction was performed with the cylinder evacuated to 5–10 mmHg while water and other low molecular weight forms were removed through the vent ports.

The temperature in the reflux tubes fitted on the vent boxes at vent ports 1, 2 and 3 was set at 60°–100° C., so that part of the lactide, diphenylmethane and lactic acid prepolymer was liquefied and recovered and then refluxed from the vent ports into the cylinder. Water that was isolated from the lactide and the like within the reflux tubes was recovered as such into traps without returning to the reaction system. The lactide that was not recovered in the reflux tubes but simply lost by evaporation was compensated by supplying a metered amount of molten lactide through an inlet on the sidewall of the cylinder so as to sustain the polycondensation reaction.

Any solvents that remained in the product polymer were devolatilized through vent ports 4 and 5 at the final stage of the polymer production process.

The time of reaction within the extruder was about 48 min.

The polymer emerging from the extruder after the end of the reaction was found to have a weight-average molecular weight of 100,250, which was higher than 100,000, or a minimum value that enabled molding into films, containers and other shapes that would require mechanical strength.

As it was kept heated, the synthesized polymer was fed into an inflation film molding machine so as to form a film in a thickness of 90 μm. The film had the following mechanical characteristics: tensile strength; 185 kgf/cm$^2$, elongation; 43%.

EXAMPLE 5

A 10 l batch-type polymerization reactor of the same type as used in Example 1 was charged with L-lactic acid, as well as a catalyst (manganese acetate) that was added in an amount of 0.5 parts by weight per part by weight of L-lactic acid. Reaction was then performed at an evacuated pressure of 3–10 mmHg and at a controlled temperature of 120°–175° C., yielding L-lactic acid prepolymer having a weight-average molecular weight of 48,890.

The prepolymer was then fed into an extruder and subjected to polycondensation in a nitrogen gas atmosphere. The extruder was of the same type as used in Example 1 and operated under the following conditions:

| | |
|---|---|
| Feed rate: | 3.20 kg/h |
| Screw rotating at: | 150 rpm |
| Cylinder temperature: | zone 1 = 90° C. |
| | zones 2 & 3 = 165° C. |
| | zones 4–10 = 168° C. |
| | zones 11–13 = 160° C. |
| | die = 160° C. |

The cylinder was supplied with L-lactic acid polymer ($\overline{Mw}$=136,500) as a resin-seal forming material through the hopper fitted on zone 1.

Additionally, the cylinder was charged with catalyst MnCO$_3$ in an amount of 0.5 parts by weight per part by weight of the prepolymer feed through the inlet port fitted on zone 2. At the same time, ethylene glycol was added through the catalyst inlet in an amount of 5.4 parts by weight per part by weight of the prepolymer feed. The reaction was performed with the cylinder evacuated to 5–10 mmHg while water and other low molecular weight forms were removed through the vent ports.

The temperature in the reflux tubes fitted on the vent boxes at vent ports 1, 2 and 3 was set at 60°–100° C., so that part of the lactide, ethylene glycol and lactic acid prepolymer was liquefied and recovered and then refluxed from the vent ports into the cylinder. Water that was isolated from the lactide and the like within the reflux tubes was recovered as such in traps without returning to the reaction system. The lactide that was not recovered in the reflux tubes but simply lost by evaporation was compensated by supplying a metered amount of molten lactide through an inlet on the sidewall of the cylinder so as to sustain the polycondensation reaction.

Any solvents that remained in the product polymer were devolatilized through vent ports 4 and 5 at the final stage of the polymer production process.

The time of reaction within the extruder was about 49 min.

The polymer emerging from the extruder after the end of the reaction was found to have a weight-average molecular weight of 115,700, which was higher than 100,000, or a minimum value that enabled molding into films, containers and other shapes that would require mechanical strength.

As it was kept heated, the synthesized polymer was fed into an inflation film molding machine so as to form a film in a thickness of 65 μm. The film had the following mechanical characteristics: tensile strength; 155 kgf/cm$^2$ elongation; 33%. EXAMPLE 6

A 10 l batch-type polymerization reactor of the same type as used in Example 1 was charged with L-lactic acid, as well as a catalyst (SnCl$_2$) that was added in an amount of 0.5 parts by weight per part by weight of L-lactic acid. Reaction was then performed at an evacuated pressure of 3–10 mmHg and at a controlled temperature of 120°–175° C., yielding L-lactic acid prepolymer having a weight-average molecular weight of 48,890.

The prepolymer was then fed into an extruder and subjected to polycondensation in a nitrogen gas atmosphere. The extruder was of the same type as used in Example 1 and operated under the following conditions:

| | |
|---|---|
| Feed rate: | 3.30 kg/h |
| Screw rotating at: | 150 rpm |
| Cylinder temperature: | zone 1 = 90° C. |
| | zones 2 & 3 = 160° C. |
| | zones 4–10 = 175° C. |
| | zones 11–13 = 170° C. |
| | die = 170° C. |

The cylinder was supplied with L-lactic acid polymer ($\overline{Mw}$=138,760) as a resin-seal forming material through the hopper fitted on zone 1.

Additionally, the cylinder was charged with catalyst tin octylate in an amount of 0.3 parts by weight per part by weight of the prepolymer feed through the inlet port fitted on zone 2. At the same time, diphenyl ether was added through the catalyst inlet in an amount of 5.4 parts by weight per part by weight of the prepolymer feed. The reaction was performed with the cylinder evacuated to 5–10 mmHg while water and other low molecular weight forms were removed through the vent ports.

The temperature in the reflux tubes fitted on the vent boxes at vent ports 1, 2 and 3 was set at 95°–115° C., so that part of the lactide, diphenyl ether and lactic acid prepolymer was liquefied and recovered and then refluxed from the vent ports into the cylinder. Water that was isolated from the lactide and the like within the reflux tubes was recovered as such into traps without returning to the reaction system. The lactide that was not recovered in the reflux tubes but simply lost by evaporation was compensated by supplying a metered amount of molten lactide through an inlet on the sidewall of the cylinder so as to sustain the polycondensation reaction.

Any solvents that remained in the product polymer were devolatilized through vent ports 4 and 5 at the final stage of the polymer production process.

The time of reaction within the extruder was about 48 min.

The polymer emerging from the extruder after the end of the reaction was found to have a weight-average molecular weight of 153,900, which was higher than 100,000, or a minimum value that enabled molding into films, containers and other shapes that would require mechanical strength.

The polymers thus produced were passed through a T-die to be shaped into packaging films, which were found to have the following mechanical characteristics: tensile strength; 257 kgf/cm$^2$, elongation; 40%.

INDUSTRIAL APPLICABILITY

The process of the invention comprises basically the steps of preparing a prepolymer from lactic acid and then performing polycondensation of the prepolymer in a common screw-type extruder to produce lactic acid polymer. The process is characterized by using reflux tubes for controlling the chemical equilibria in the polymerization reaction so that they are shifted toward the polymer forming side and this enables lactic acid polymer with a weight-average molecular weight of at least 100,000 to be produced within a short time. Being thusly characterized, the invention offers the following advantages.

1. The process of the invention does not use expensive lactide as a feed for polymerization but uses inexpensive lactic acid which can be produced in high volume, hence, compared to the conventional methods, the process of the invention achieves a significant decrease in the production cost of lactic acid polymer.

2. Since lactide and low molecular weight compounds of lactic acid are refluxed within the reaction system, the chemical equilibria in the reacting solution will not shift toward the ring forming side which involves the lactide forming reaction but the reaction on the chain bonding side will predominate to enable the production of the desired high molecular weight form of lactic acid within a short time.

3. Using a screw-type extruder which has higher feed mixing and kneading performance than the conventional batch-type polymerization reactor contributes to a marked enhancement in the ability to refresh the surface of the lactic acid prepolymer and, hence, the polycondensation reaction of the prepolymer proceeds rapidly enough to enable efficient production of the desired high molecular weight form of lactic acid.

4. The synthesis of lactic acid polymer and the subsequent production of a shaped article are integrated into the process of the invention and there is no need to include the pelletizing step. Hence, the thermal history to be exerted upon the polymer is greatly reduced and this feature, combined with the absence of the need to worry about the hydrolysis which will occur during the storage of pellets, ensures maximum protection against deterioration in the quality of the final product.

What is claimed is:

1. A process for producing lactic acid polymer comprising the steps of:
   polycondensing lactic acid to a lactic acid prepolymer having a weight-average molecular weight of 10,000–50,000 in a batch-type polymerization reactor; and
   polycondensing said lactic acid prepolymer to polylactic acid having a weight-average molecular weight of at least 100,000 by means of a screw-type extruder which forms a second reactor.

2. A process according to claim 1 wherein said lactic acid prepolymer is produced by the polycondensation of lactic acid in said batch-type polymerization reactor in such a way that the by-product water is removed by a degasification procedure while the unreacted lactic acid, as well as the produced lactide and low molecular weight compounds that have been distilled off together with the by-product water are refluxed to said batch-type polymerization reactor.

3. A process according to claim 2 wherein lactide is added to said lactic acid.

4. A process according to claim 2 wherein said refluxing is performed in vacua at a pressure of 0.1–100 mmHg.

5. A process according to claim 2 wherein said refluxing is performed under heating at a temperature of 90°–180° C.

6. A process according to claim 2 wherein a solvent is added when said unreacted lactic acid, as well as said produced lactide and low molecular weight compounds that have been distilled off together with the by-product water are refluxed to said batch-type polymerization reactor.

7. A process according to claim 6 wherein said refluxing is performed under heating at a temperature of 50°–130° C.

8. A process according to claim 1 wherein said polylactic acid is produced by the polycondensation of said lactic acid prepolymer in said screw-type extruder in such a way that the by-product water is removed by a degasification procedure while the unreacted lactic acid, as well as produced lactide and low molecular weight compounds that have been distilled off together with the by-product water are refluxed to said screw-type extruder.

9. A process according to claim 8 wherein lactide is added to said lactic acid prepolymer.

10. A process according to claim 8 wherein said refluxing is performed in vacua at a pressure of 0.1–100 mmHg.

11. A process according to claim 8 wherein said refluxing is performed under heating at a temperature of 90°–180° C.

12. A process according to claim 8 wherein a solvent is added when said unreacted lactic acid, as well as said produced lactide and low molecular weight compounds that have been distilled off together with the by-product water are refluxed to said screw-type extruder.

13. A process according to claim 12 wherein said refluxing is performed under heating at a temperature of 50°–130° C.

14. A process according to claim 1 wherein lactic acid polymer having a weight-average molecular weight of 80,000–250,000 is added to said lactic acid prepolymer when it is fed into said screw-type extruder.

15. A process according to claim 1 wherein any solvents that remain in said lactic acid prepolymer are removed by a devolatilization procedure in said screw-type extruder.

16. A process for direct production of a shaped article of lactic acid polymer comprising the steps of polycondensing lactic acid to a lactic acid prepolymer having a weight-average molecular weight of 10,000–50,000 in a batch-type polymerization reactor, polycondensing said lactic acid prepolymer to lactic acid polymer having a weight-average molecular weight of at least 100,000 by means of a screw-type extruder which forms a second reactor, and shaping said lactic acid polymer by extrusion from said screw-type extruder.

* * * * *